US011486359B1

(12) United States Patent
Sankar

(10) Patent No.: US 11,486,359 B1
(45) Date of Patent: Nov. 1, 2022

(54) MULTI-STAGE WIND TURBINE

(71) Applicant: KINRG, Inc., Annapolis, MD (US)

(72) Inventor: Lakshmi Sankar, Atlanta, GA (US)

(*) Notice: Subject to any disclaimer, the term of this patent is extended or adjusted under 35 U.S.C. 154(b) by 0 days.

(21) Appl. No.: 17/487,537

(22) Filed: Sep. 28, 2021

(51) Int. Cl.
| | | |
|---|---|---|
| *F03D 9/25* | (2016.01) | |
| *F03D 1/04* | (2006.01) | |
| *F03D 1/02* | (2006.01) | |
| *H02K 7/18* | (2006.01) | |
| *F03D 80/60* | (2016.01) | |

(52) U.S. Cl.
CPC ............... *F03D 9/25* (2016.05); *F03D 1/02* (2013.01); *F03D 1/04* (2013.01); *F03D 80/60* (2016.05); *H02K 7/183* (2013.01); *F05B 2220/706* (2013.01); *F05B 2240/21* (2013.01); *F05B 2240/37* (2020.08)

(58) Field of Classification Search
CPC ..... F03D 9/25; F03D 1/02; F03D 1/04; F03D 80/60; H02K 7/183; F05B 2220/706; F05B 2240/21; F05B 2240/37
USPC ...................................................... 290/44, 55
See application file for complete search history.

(56) References Cited

U.S. PATENT DOCUMENTS

| 4,452,046 A * | 6/1984 | Valentin ..................... F03D 9/39 60/641.11 |
| 5,982,046 A * | 11/1999 | Minh ......................... F03D 1/02 290/55 |
| 8,232,665 B2 * | 7/2012 | Sato ........................... F03D 9/25 290/55 |
| 8,727,698 B1 * | 5/2014 | Pickett ....................... F03D 9/25 415/909 |
| 10,989,171 B2 * | 4/2021 | Pickett ...................... F15B 1/027 |
| 2011/0316279 A1 * | 12/2011 | Bahari ....................... F03D 1/04 290/55 |
| 2012/0274068 A1 * | 11/2012 | Hanback ................... F03D 1/04 290/55 |
| 2013/0103202 A1 * | 4/2013 | Bowyer .................. F03D 7/048 700/275 |
| 2014/0110941 A1 * | 4/2014 | Kjær ....................... F03D 7/048 290/44 |

(Continued)

FOREIGN PATENT DOCUMENTS

| EP | 3330533 A1 * | 6/2018 | ............... F03D 1/04 |
| KR | 100500709 B1 * | 1/2002 | |
| KR | 20200139481 A * | 6/2019 | |

(Continued)

*Primary Examiner* — Charles Reid, Jr.
(74) *Attorney, Agent, or Firm* — Laubscher & Laubscher P.C.

(57) ABSTRACT

A multi-stage wind power extractor includes a tunnel and at least two turbines. The tunnel is circular in a cross-section and has a horizontal axis, first and second open ends, and a length that is greater than a diameter of the tunnel. The tunnel diameter progressively increases from the first open end to the second open end. The turbines are arranged in spaced relation within and coaxial with the tunnel. Each includes a rotor having a plurality of radially extending blades, a controller connected with the rotor, and a motor connected with the controller. The controllers independently engage and disengage their respective rotors in accordance with a wind velocity travelling through the tunnel from the first open end to the second. In turn, when a rotor is engaged, the motor provides power to a generator that is connected therewith.

11 Claims, 3 Drawing Sheets

(56) References Cited

U.S. PATENT DOCUMENTS

2016/0186718 A1\* 6/2016 Allaei .................... F03D 80/80
　　　　　　　　　　　　　　　　　　　　　　　　415/80
2021/0226452 A1\* 7/2021 Biris .................... H02J 3/0012

FOREIGN PATENT DOCUMENTS

KR　　　　102383543 B1 \* 7/2021
WO　WO-2008086608 A1 \* 7/2008 ........... F03D 7/0276

\* cited by examiner

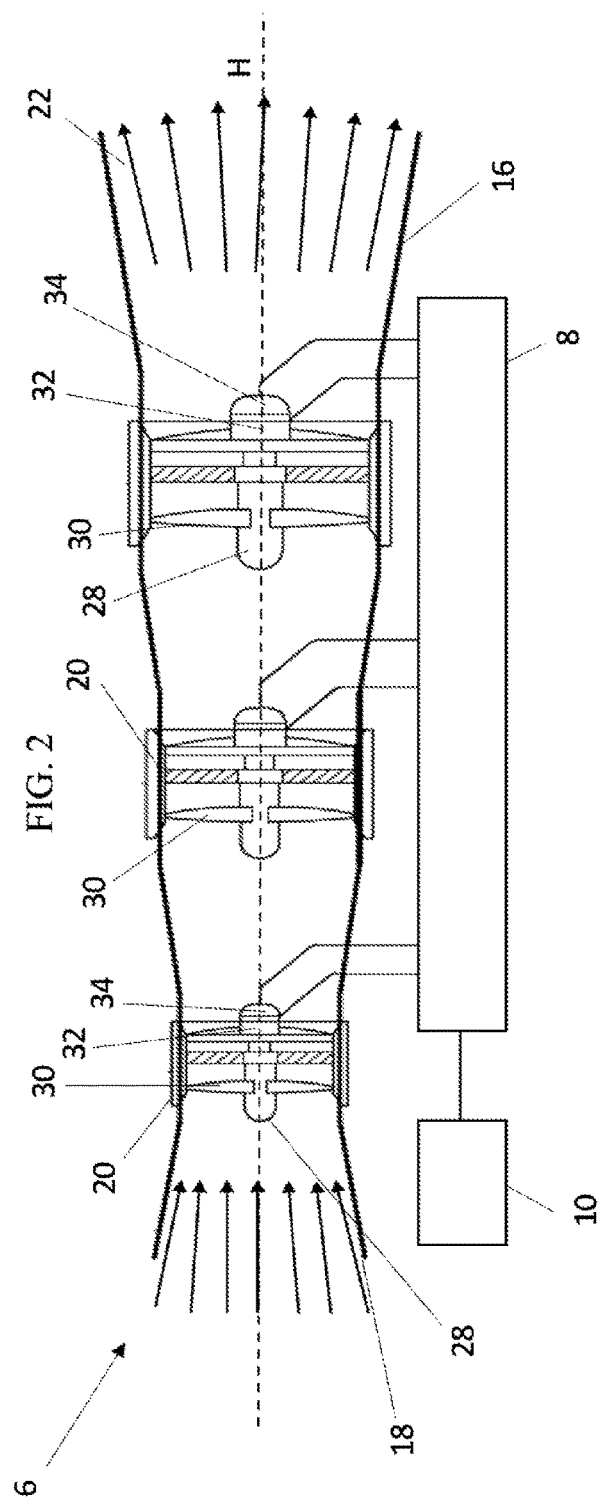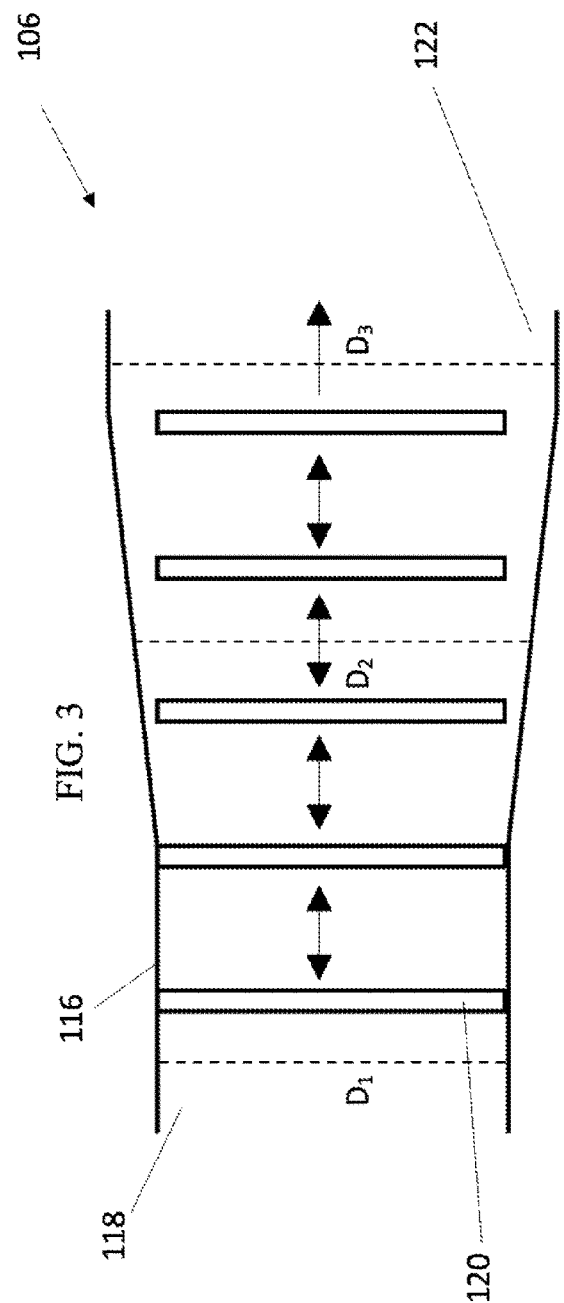

MULTI-STAGE WIND TURBINE

BACKGROUND OF THE DISCLOSURE

The present disclosure relates generally to turbines, and more specifically to wind turbines.

Wind turbines that include single stage extraction features are well known in the industry. These conventional horizontal axis wind turbines, hydrokinetic turbines, and tidal turbines use single turbine rotors which results in power extraction rates that equate to approximately 40% to 50% of the available energy. Any unused energy is wasted. Gas and steam turbine engines, on the other hand, use multiple stage turbines to extract energy. The result is that the residual energy that travels downstream from a first rotor stage is also extracted, increasing the overall energy extraction rate.

In addition to the drawbacks of single-stage turbines, the distance between rotors in multi-stage turbines has an effect on extraction rates. Generally, as a stream tube (i.e. bundle of streamlines entering and leaving a turbine) travels through a turbine, the streamlines expand resulting in decreased velocity in the stream tube. Thus, rotors that are spaced too far apart hinder efficiency. Further, rotors that are too close to each other result in interferences within the stream tube, resulting in a loss in power production as well as vibrations due to wake-blade interactions.

Another issue with wind turbines is extracting low energy at low wind speeds. At sufficiently high wind speeds, all rotors will produce useful power. However, at low wind speeds, the first stage turbine absorbs the bulk of the energy available, resulting in a residual wind velocity that may be too small to drive the subsequent rotor stages, thus reducing the efficiency of the turbines.

Accordingly, there is a need for more efficient wind power extraction that reduces or eliminates the above-noted drawbacks that arise during known wind extraction processes. Specifically, there is a need for turbines that extract more power, that consider the expanding stream tube, and that adequately manage turbine stages during high and low wind speeds.

SUMMARY OF THE DISCLOSURE

Accordingly, it is an object of the present disclosure to provide a multi-stage wind power extractor that includes a tunnel and at least two turbines. The tunnel is circular in a cross-section and has, a horizontal axis, first and second open ends, and a length that is greater than a diameter of the tunnel. The tunnel diameter progressively increases from the first open end to the second open end. The turbines are arranged in spaced relation within and coaxial with the tunnel. Each includes a rotor having a plurality of radially extending blades, a controller connected with the rotor, and a motor connected with the controller. The controllers independently engage and disengage their respective rotors in accordance with a wind velocity travelling through the tunnel from the first open end to the second. In turn, when a rotor is engaged, the motor provides power to a generator that is connected therewith. Preferably, the motor includes a hydraulic motor for providing power to the generator via hydraulic fluid. The controllers are configured to engage the rotors in linear succession from the first open end toward the second open end based on a wind velocity present within the tunnel. The controllers will disengage the rotors in a similar fashion from the second open end toward the first open end based on a rotation rate of the rotors.

In one embodiment, a distance between the turbines corresponds to half the length of the rotor blades. For instance, the tunnel may have a first diameter of 22 meters adjacent the first open end and a second diameter of 27 meters adjacent the second open end with a total length of the tunnel being 27.5 meters. In this example, there is a constant diameter between the first and second turbines, a linearly expanding diameter between the subsequent turbines, and a constant diameter between the final turbine and the second open end. Preferably, there are five turbines in total. The tunnel length, wind speed, and other relevant factors will determine the configuration of the tunnel and arrangement of the turbines.

It is another object of the present disclosure to provide a wind turbine system that includes a wind tower, the wind power extractor described above, and a plenum chamber. The chamber is connected with the second end of the power extractor tunnel and configured to receive and contain pressurized air. The plenum chamber includes a duct having a first end connected with the chamber and a second end connected with a cooling system for transferring pressurized air from the chamber to the cooling system. Preferably, an exhaust outlet is connected with the plenum chamber to expel pressurized air into the atmosphere.

BRIEF DESCRIPTION OF THE FIGURES

Other objects and advantages of the disclosure will become apparent from a study of the following specification when viewed in the light of the accompanying drawing, in which:

FIG. 2 is a cross-sectional side view of one embodiment of a wind turbine according to the present disclosure;

FIG. 3 is schematic diagram of a second embodiment of a wind turbine according to the present disclosure.

DETAILED DESCRIPTION

Figure 1:
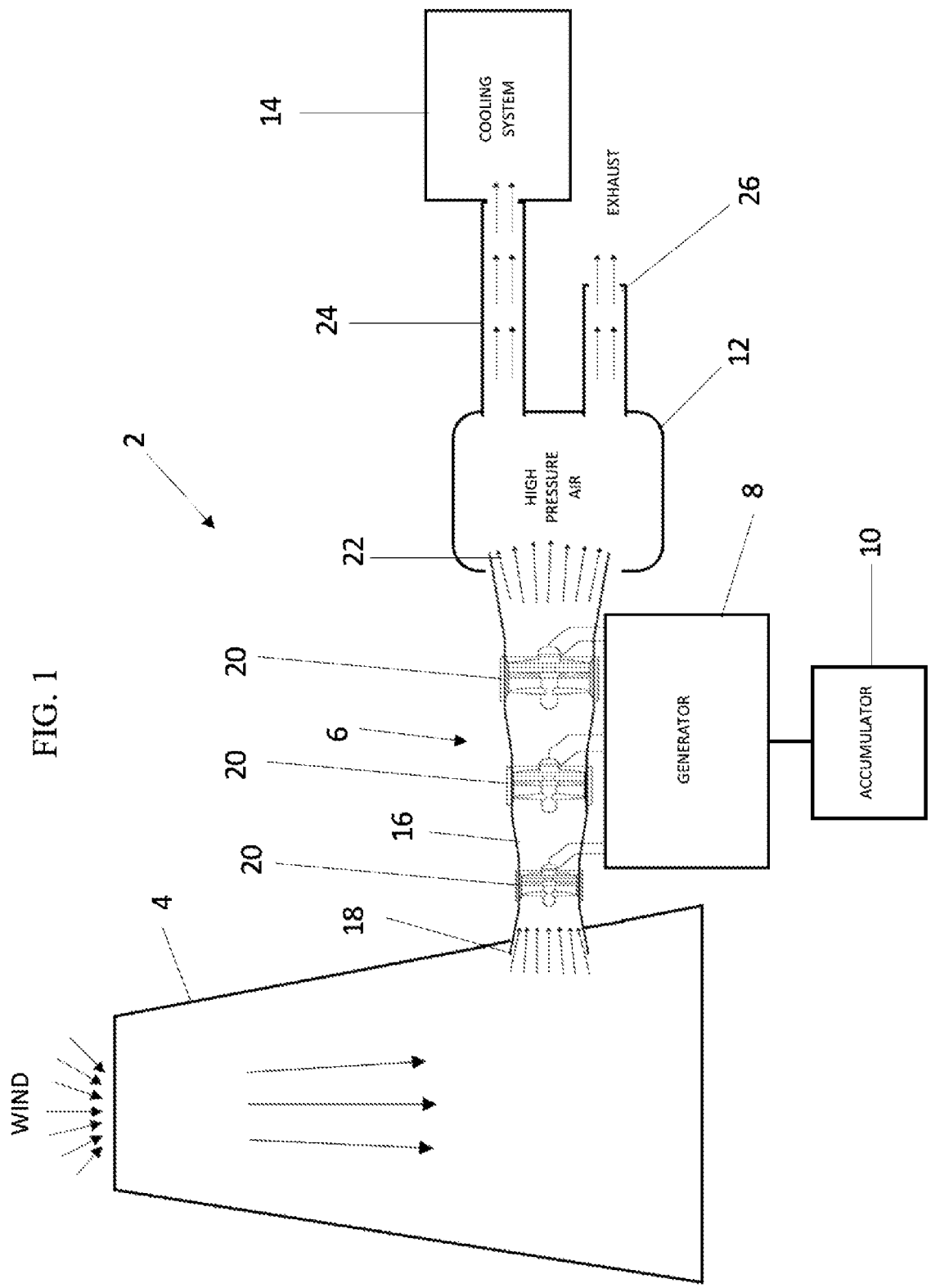
FIG. 1 is a schematic diagram of a wind turbine system according to one embodiment of the present disclosure.

The present disclosure relates to multi-stage wind turbines. FIG. 1 shows a wind turbine system 2 that includes a tower 4 with a multi-stage power extractor 6 which is connected with a generator 8, an accumulator 10, and a high-pressure plenum chamber 12. The plenum chamber is connected with a cooling system 14. Wind travels into the tower and is moistened causing it to fall to the bottom of the tower, become compressed, and increase in speed. The wind then travels through a first opening 18 of the extractor tunnel 16 through a first opening to begin the extraction of wind energy. As wind travels through the tunnel and past wind turbines 20 arranged within the tunnel, wind energy is extracted and provided to the generator. Excess wind energy may be stored in the accumulator if desired. Residual high-pressure air is expelled through a second tunnel opening 22 into the plenum chamber where it is stored. The high-pressure air is then either directed to the cooling system through a duct 24 or is expelled through an exhaust outlet 26 into the atmosphere. Though the number of power extractor tunnels may vary depending on the environment and location of a wind tower, in a preferred embodiment, the system includes 40 such wind tunnels with turbines.

As will be discussed in further detail below, the power extractor 6 of this embodiment includes three turbine stages 20, each of which is independently controlled to increase the efficiency of power extraction from wind that passes through the tunnel 16. Depending on the wind velocity, one, two, or three rotors will be engaged to extract energy from the wind. If the wind velocity falls below a lower threshold, preferably such that the rotors are rotating at less than 50 revolutions per minute (RPM or RPMs), all three rotors will be disengaged from the power source.

As noted above, in addition to wind turbines connected with the wind tunnel, there is a plenum chamber 12 for storing any residual or left-over high-pressure air. The plenum chamber is included because downstream of the last stage of the multi-stage turbine, there is still a significant amount of kinetic energy traveling out of the second opening. The plenum chamber retains this extra supply of air as an auxiliary source, preferably for air-conditioning systems that cool nearby buildings and plants. It will be understood by those with skill in the art that a plenum chamber and cooling system need not be included to provide improvements over know methods and systems for extracting wind power.

In the schematic of FIG. 1, air enters into the tower 4 as described above. Depending on the ambient conditions (temperature, relative humidity), the pressure and velocity of the air flow entering each of the tunnels 16, as well as the mass flow rate ṁ in kilograms per second through each of the tunnels can be computed. The stagnation pressure of the air in the high pressure plenum chamber 12 may be estimated from conservation of energy principles with the following equation:

$$\frac{p_1}{\rho} + \frac{V_1^2}{2} - \frac{W}{\dot{m}} = \frac{p_0}{\rho}$$

where the air pressure at the first turbine 20 is $p_1$, the wind velocity passing through the turbine is $V_1$, the power extracted in watts by the turbine is W, and the air pressure within the plenum chamber is $p_0$.

This equation assumes no viscous losses and low speed flow when the local velocity is well below the speed of sound. In practice, there will be viscous losses in the system due to wall skin friction, blockage of air flow in constrictions within the tunnels, or other factors. Nevertheless the plenum chamber pressure is considerably higher than atmospheric pressure.

The air collected in the plenum chamber has two outlets. The first is the exhaust outlet 26, controlled by a relief valve (not shown) that deposits unused air into the atmosphere. The second is an air duct 24 that carries high pressure air from the chamber 12 to the cooling system 14 to reduce energy costs of that system.

Cooling systems normally use a number of pumps in their operation. For example, one pump, known as a compressor, maintains the flow of refrigerant. It is used to compress and liquefy the refrigerant and pump it through cooling coils. A second pump, often referred to as a fan, carries the chilled air into a plant (e.g. data center) that requires cooling. A third pump draws air, usually from the atmosphere, and raises its pressure sufficiently so that it would flow through the gaps between cooling coils.

For the embodiment of FIG. 1, the third pump would need to perform significantly less work, and in turn consume less power, since the air supply entering this third pump is already at an elevated pressure $p_0$. As a result, the power required to operate the air conditioning system will be reduced, providing meaningful additional savings to the operation of the plant.

Turning now to FIG. 2, the power extractor 6 shown in FIG. 1 will be discussed in detail. It includes a cylindrical tunnel 16 having a horizontal axis H, a first open end 18, a second open end 22, and three sets of turbines 20 arranged between the two ends, each of which includes a rotor 28 having blades 30, a controller 32 connected with the rotor and a hydraulic motor 34 connected with the controller. Each hydraulic motor is connected with a generator and an accumulator, though an accumulator need not be included to carry out proper energy extraction.

As wind travels through the tunnel, each controller 32 will engage its relative rotor 28 based on a wind velocity. The controller may be powered by the generator or another standard power source, not shown herein. When the wind velocity reaches a first threshold, the controller of the first turbine 20 engages the corresponding rotor 28 which in turn provides wind energy to the generator 8 via the hydraulic motor 34. If there is excess energy, it is stored in the accumulator 10. As the wind velocity increases, the second turbine is similarly engaged, and additional wind energy is extracted. Ultimately, when the wind velocity is sufficiently high, the third turbine is engaged, and further energy is extracted. While the velocity of the wind remains at or above a threshold, all three rotors will remain in operation. As the wind velocity decreases, controllers successively decouple respective rotors from the system beginning with the rightmost rotor until the wind velocity reaches a lower threshold and all three rotors are no longer engaged. Additional stages may be added downstream of the third rotor if sufficiently high velocities are projected. For instance, rather than three stages, five stages may be best if air velocity is projected to be sufficiently high.

Referring now to FIG. 3, a schematic of a second embodiment of a multi-stage wind power extractor 106 is shown. This includes a cylindrical tunnel 116 having a first open end 118 and a second open end 122 and five turbines 120 arranged between each end. Though not shown, it will be understood that the turbines 120 include the elements shown in FIG. 2, including rotors with blades, a controller and a hydraulic motor. Each turbine is similarly connected with a generator.

For this embodiment, the turbine 120 farthest to the left (i.e. the first turbine) is located 5.5 meters beyond the first open end 118. Each subsequent turbine is arranged 5.5 meters beyond the previous one. The radius of each turbine is 11 meters regardless of the diameter of the tunnel, and all five turbines are designed for the rotor blades to spin at a fixed 200 RPM. It will be understood by those with skill in the art that the arrangement of this embodiment is one example of how the wind power extractor can be arranged. For alternative embodiments, the number of turbines, distance between each turbine, and RPMs of rotor blades will vary based on the specific needs and environment of a location. This 22-meter diameter configuration may be geometrically scaled to accommodate larger and smaller diameter tunnels, depending on the meteorological projections for the wind velocity and mass flow rate at the entrance to the tunnel at a particular site.

In this embodiment, the tunnel has a constant initial diameter $D_1$ from the first open end 118 up to the second turbine 120. This diameter is preferably 22 meters. Following that, the tunnel has a second diameter $D_2$ that steadily and linearly expands up to the fifth turbine, at which point a tunnel diameter $D_3$ remains constant up to the second opening 122. Preferably, the final tunnel diameter is 13.5 meters, and the total tunnel length is 27.5 meters. As noted above, this embodiment is one example, and the above-described arrangement will vary dependent upon location of a tower and energy extractor.

The embodiment of FIG. 3 is optimized for situations where the wind velocity within the tunnel varies over a broad range, which may be between 15 meters per second or less to 65 meters per second. When incorporated with the system shown in FIG. 1, the rated power is 50 megawatts per turbine at the highest wind speed of 65 meters per second in the tunnel, which totals 2 gigawatts for a 40 tunnel system. Again, if the operating conditions (e.g. turbine speed, power needs) are different, it will be necessary to modify the present design, specifically the tunnel diameter, blade length, rotor spacing, and revolutions per minute.

As noted above, the spacing between each turbine stage for the specific embodiment of FIG. 3 is 5.5 meters, which is half the rotor blade radius. This distance maximizes power extraction in that instance. Different embodiments may require a different length between turbines to maximize power extraction. If the spacing between turbine stages is too large, significant reduction in the flow velocity occurs due to the expansion of the stream tube downstream from the previous stage. This would lead to a lower power production for subsequent stages. Alternatively, if the stages are too close, adverse aerodynamic interference will occur. For example, the low velocity wake from blades arranged upstream would impact subsequent stages, causing vibrations, noise, and fatigue. It will be understood by those with skill in the art that the ratio of an 11 meter rotor radius to a 5.5 meter distance between rotors is optimal in the embodiment of FIG. 3. Based on location and the surrounding environment of a tower, the rotor radius and the distance between rotors should be accordingly altered.

For the above-noted embodiments, when the wind speed that is upstream from a turbine is too low, the power extracted from the incoming stream is lower than the power needed to overcome the viscous forces acting on the blades. As a result, a negative power production occurs, causing the blades to spin in an opposite direction. The controller is therefore needed to adjust this situation. For example, when there is a rapid drop in the RPM of a rotor, this is an indication that the rotor will not produce useful power. When the RPMs of a rotor fall below a threshold, for instance that threshold may be 50 RPMs, the controller would disengage the rotor, resulting in no power being extracted from the rotor and the rotor being able to spin freely.

As stated earlier, the turbine stages of an efficient power extractor are designed to rotate at 200 RPMs. The power load from each stage would be adjusted to maintain this rate. If the rotor blades speed up, the power load (i.e. power extracted) from that rotor would be increased by the controller, drawing more power from the generator, resulting in the resistive electromotive torque slowing down the rotor to 200 RPM.

In addition to changes in the size of the rotor blades and spacing between the rotors, the rotor configuration can vary depending on particular surrounding conditions and preferred energy extraction. For example, rotors with blades that are 11 meters in length preferably have a shaft with a radius of 0.825 meters. A different length blade, however, will result in a different shaft radius. Moreover, the chord length and the twist of the blade from shaft to tip would vary to maximize power production.

Figure 4:
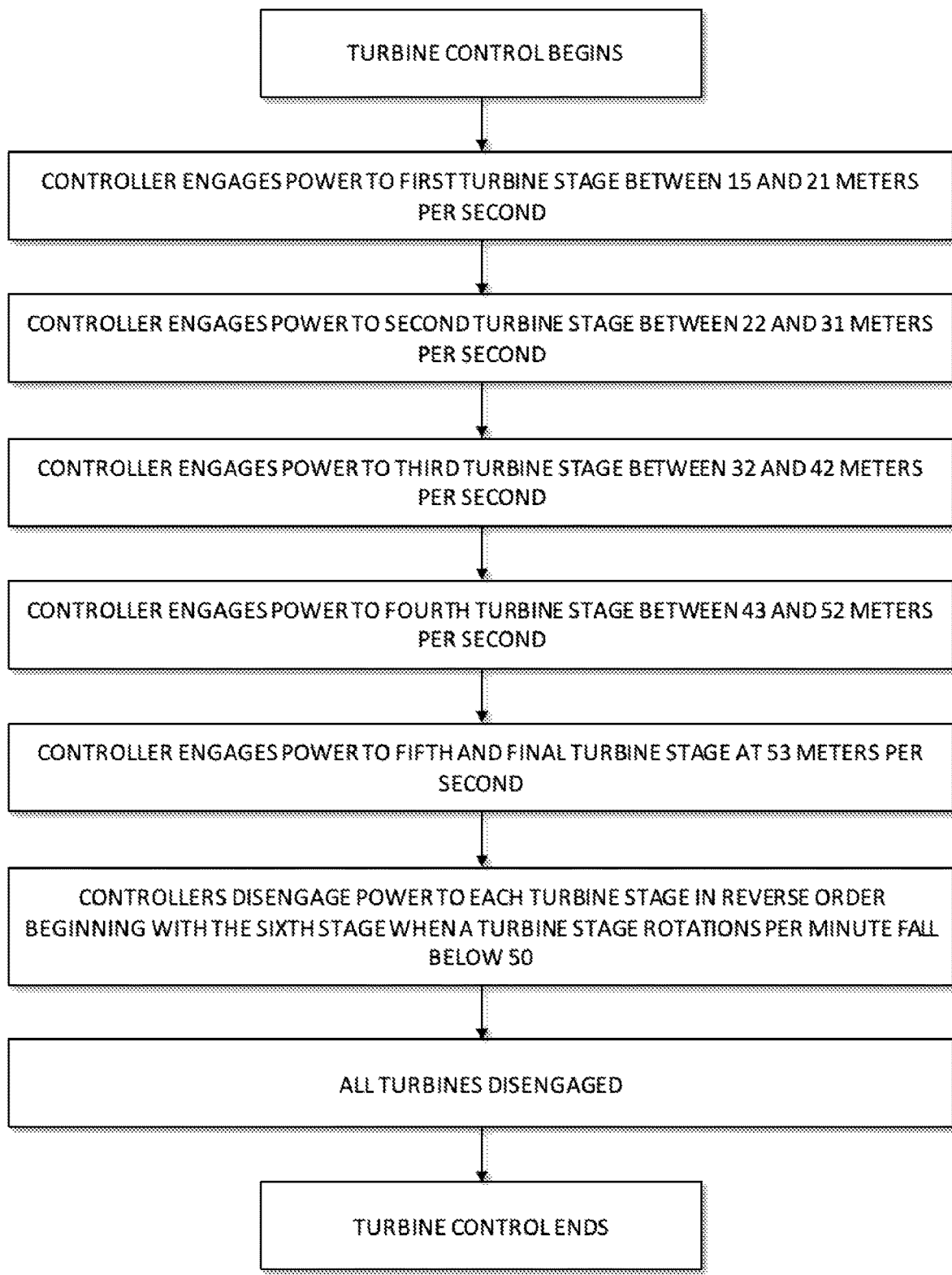
FIG. 4 is a flow chart of a sequence of controls of a wind turbine according to the present disclosure.

Referring now to FIG. 4, there is shown a preferred sequence for coupling and decoupling rotors to efficiently extract power from wind energy. The first stage runs from a wind speed of 15 meters per second to 21 meters per second with only one turbine being operated. The subsequent turbines will be decoupled from the generator, resulting in no power being produced from these turbines and the respective rotors being free to spin. The power production for this stage varies from 370 kilowatts for the individual turbine in the tunnel (1.48 megawatts for a system of 40 tunnels) at 15 meters per second to 1.67 megawatts per turbine (67.8 megawatts from 40 tunnels) at 21 meters per second.

The second stage comes on at a wind speed of 22 meters per second. From 22 meters per second to 31 meters per second, only the first two turbines will operate, and all others will be decoupled. The power production varies from 1.67 kilowatts per turbine (67.8 megawatts for a system of 40 tunnels) at 21 meters per second to 5.86 megawatts per turbine (234 megawatts from 40 tunnels) at 31 meters per second.

The third stage engages at a wind speed of 32 meters per second and lasts up to 42 meters per second. For this stage, only the first three turbines will operate, while the subsequent turbines will be decoupled from the generator. The power production varies from 6.4 megawatts per turbine (256 megawatts for a 40 tunnel system) at 32 meters per second to 15 megawatts per turbine (600 megawatts from all 40 tunnels) at 42 meters per second.

The fourth stage is engaged at a wind speed of 43 meters per second. From 43 meters per second to 52 meters per second, the first four turbines will operate, while the fifth stage is decoupled from the generator. The power production varies from 16.2 megawatts per turbine (648 megawatts for a 40 tunnel system) at 43 meters per second to 24.6 megawatts per turbine (984 megawatts from all 40 tunnels) at 52 meters per second.

The fifth and final stage is engaged at a wind speed of 53 meters per second and preferably lasts up to 65 meters per second. The power production continues to rise from 25.6 megawatts per turbine (1.02 gigawatts for a 40 tunnel system) at 53 meters per second to 49.5 megawatts per turbine (2 gigawatts from all 40 tunnels) at 65 meters per second.

The rotor blades are preferably designed to withstand structural loads up to 75 meters per second wind speeds. However, such high wind speeds are unlikely and considered extreme conditions. Accordingly, turbine operations preferably cease above 75 meters per second.

Although the above description includes references to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A multi-stage wind power extractor, comprising:
    (a) a tunnel having a horizontal axis and first and second open ends, a length of said tunnel being greater than a diameter of said tunnel, said tunnel having a circular cross-section and a diameter progressively increasing from said first open end to said second open end;
    (b) at least two turbines arranged within and coaxial with said tunnel, each turbine including:
        (1) a rotor having a plurality of radially extending blades;

(2) a controller connected with said rotor; and
(3) a motor connected with said controller; and (c) a generator selectively connected with said turbines, said controllers independently engaging and disengaging said rotors in linear succession in accordance with a predetermined wind velocity through said tunnel from said first open end to said second open end to maximize power provided to said generator.

2. The multi-stage wind power extractor as defined in claim 1, wherein said motor comprises a hydraulic motor for providing power to said generator via a hydraulic fluid.

3. The multi-stage wind power extractor as defined in claim 1, wherein each controller is configured to disengage said respective rotor in accordance with predetermined rotor rotation rates in linear succession from said second open end toward said first open end.

4. The multi-stage wind power extractor as defined in claim 3, wherein a distance between successive turbines corresponds to half the length of said rotor blades.

5. The multi-stage wind power extractor as defined in claim 4, wherein said tunnel includes five spaced turbines, said tunnel having a constant diameter between said first and second turbine, a linearly increasing diameter between said second and fifth turbines and a constant diameter between a fifth turbine and said tunnel second open end.

6. The multi-stage wind power extractor as defined in claim 3, wherein said at least two turbines have rotor blades of equal length.

7. The multi-stage wind power extractor as defined in claim 3, wherein said turbines each have a rotor blade length corresponding with a diameter of said tunnel at a respective location of each turbine therein.

8. The multi-stage wind power extractor as defined in claim 7, wherein a distance between successive turbines corresponds to half the length of said rotor blades.

9. The wind turbine system, comprising a wind tower, a wind power extractor as defined in claim 3, and a plenum chamber connected with said tunnel second open end and configured for receiving and containing pressurized air from said tunnel.

10. The wind turbine system as defined in claim 9, and further comprising a duct having a first end connected with said plenum chamber and a second end connected with a cooling system for transferring said pressurized air from said plenum chamber to said cooling system.

11. The wind turbine system as defined in claim 10, and further comprising an exhaust outlet having a first end connected with said plenum chamber and a second end exposed for expelling said pressurized air to the atmosphere.

\* \* \* \* \*